United States Patent [19]

Crane

[11] 3,959,850

[45] June 1, 1976

[54] COUNTER-ROTATING FOWL PICKER

[75] Inventor: Edward J. Crane, Ottumwa, Iowa

[73] Assignee: Barker International, Inc., Marietta, Ga.

[22] Filed: July 30, 1974

[21] Appl. No.: 493,023

[52] U.S. Cl. ........................ 17/11.1 R; 74/665 GB
[51] Int. Cl.² ................................. A22C 21/02
[58] Field of Search ............. 17/11.1 R; 74/665 GB

[56] References Cited
UNITED STATES PATENTS

| | | | |
|---|---|---|---|
| 647,984 | 4/1900 | Payne | 74/665 GB |
| 1,513,945 | 11/1924 | Vincent | 74/665 GB |
| 3,044,108 | 7/1962 | De Long | 17/11.1 R |
| 3,122,778 | 3/1964 | Crane et al. | 17/11.1 R |
| 3,585,675 | 6/1971 | Crane | 17/11.1 R |

Primary Examiner—Robert Peshock
Attorney, Agent, or Firm—Price, Heneveld, Huizenga & Cooper

[57] ABSTRACT

A fowl picking machine having counter-rotating picking drums on which are mounted elongated, flexible picking fingers. Alternating drums are rotated in opposite directions with the drums which rotate downwardly including a greater number of picking fingers than do the drums which rotate upwardly. The machine includes two spaced picking assemblies each including a plurality of pairs of the counter-rotating drums, each pair of drums being individually mounted in a drum assembly to provide easy access to and maintenance of the drums. Each drum assembly includes a single power shaft for simultaneously counter-rotating both drums mounted thereon. Electric motors are included to power the drums. Each motor rotates the power shafts of two drum assemblies.

31 Claims, 5 Drawing Figures

COUNTER-ROTATING FOWL PICKER

BACKGROUND OF THE INVENTION

This invention relates to fowl picking machines and, more particularly, to fowl and poultry picking devices utilizing counter-rotating drums on which are mounted elongated, flexible, resilient picking fingers.

Poultry picking machines utilizing counter-rotating picking apparatus are well known. Typically, such machines include horizontally spaced, longitudinally extending, generally parallel banks of individual cylindrical drums, one bank of drums generally opposing the other. Alternating drums in each bank are rotated in opposite directions thereby causing the flexible picking fingers attached thereto to be rotated in opposite directions against the fowl to be picked.

Typically, the mechanisms for rotating the individual drums in opposite directions have included single, elongated axles on which all of the drums have been mounted. Various drive means including belts, pulleys, or even gears have been mounted on second elongated shafts extending parallel to the single axle on which all of the drums are mounted. The second shaft is rotated in one direction with the belts or gears engaging alternating drums on the parallel axle to move those drums in the same direction as the second shaft. At the same time, a power source turns the axle on which all of the drums are mounted in a direction opposite to the direction of rotation of the second shaft causing the remaining drums which are fixed to the first axle to be rotated in an opposite direction.

The above-described mechanisms, although functioning adequately, have been difficult to repair and maintain. Should any single drum need to be removed for repair or maintenance, it is necessary to disconnect generally the entire drive apparatus and remove the axle supporting all of the drums in order to remove the single drum. The belts, pulleys or gears for transferring power to the various drums are left exposed to the feathers removed from the fowl or poultry causing clogging, disruption, and even breakdown of the picking machine often at frequent intervals. Access to the individual drums for replacement of the flexible picking fingers, removal of accumulated feathers or other foreign materials, lubrication of bearings, and the like has proved difficult with such machines.

Further, in order to keep the fowl in proper picking orientation, the prior machines have included counter-rotating drums wherein the drums rotating downwardly are rotated faster than the drums rotating upwardly. This necessitated different driving mechanisms for the counter-rotating drums adding complexity and expense to such machines.

SUMMARY OF THE INVENTION accordingly, it is the purpose of the present invention to provide a fowl picking machine utilizing counter-rotating drums in which pairs of drums are mounted in individual assemblies thereby making access for maintenance, repair, or the like extremely easy. Each individual drum assembly includes a pair of counter-rotating drums driven by a single drive mechanism, each drum having a plurality of flexible picking fingers. In the preferred embodiment, the drums rotating downwardly include a greater number of picking fingers than do the drums rotating upwardly thereby keeping the fowl in a proper picking orientation.

The fowl picking machine includes opposing picking assemblies and is completely adjustable to accommodate fowl or poultry of various sizes. Means are included for adjusting the space between the opposing picking assemblies as well as means for varying the height of the picking assemblies with respect to an overhead conveyor or other support for the fowl or poultry to be picked. Each picking assembly includes housings and internal walls separating the source of motive power for the drums from the drums themselves thereby eliminating interference from removed feathers. further, the housings provide easy access to the drum assemblies for maintenance purposes.

In one aspect of the invention, a fowl picking machine is defined comprising a frame and a pair of horizontally spaced, longitudinally extending picking assemblies supported on said frame. The spaced picking assemblies define a generally horizontally and longitudinally extending picking channel therebetween through which a fowl is moved for picking and cleaning feathers from the same. Each picking assembly includes a plurality of individual, axially aligned drum assemblies, each of the drum assemblies including a pair of counter-rotating, axially aligned drums which are immediately adjacent one another. Each drum rotates in a plane generally transverse to the picking channel. The drums each include a plurality of radially extending, flexible, picking fingers. Drive means are included for individually driving each pair of counter-rotating drums including means for simultaneously rotating said drums in said pair in directions opposite one another. Each drum in one of said picking assemblies is generally opposite to and rotates in the same direction through the picking channel as a corresponding drum in the other of said picking assemblies. In another aspect of the invention, an improved fowl picking machine is defined including a plurality of counter-rotating drums having picking fingers extending therefrom. The drums rotating downwardly have a greater number of picking fingers than do the drums rotating upwardly.

these and other objects, advantages, purposes, and features of the invention will become more apparent from a study of the following description taken in conjunction with the drawings.

DESCRIPTION OF THE PREFERRED EMBODIMENT

Figure 1:
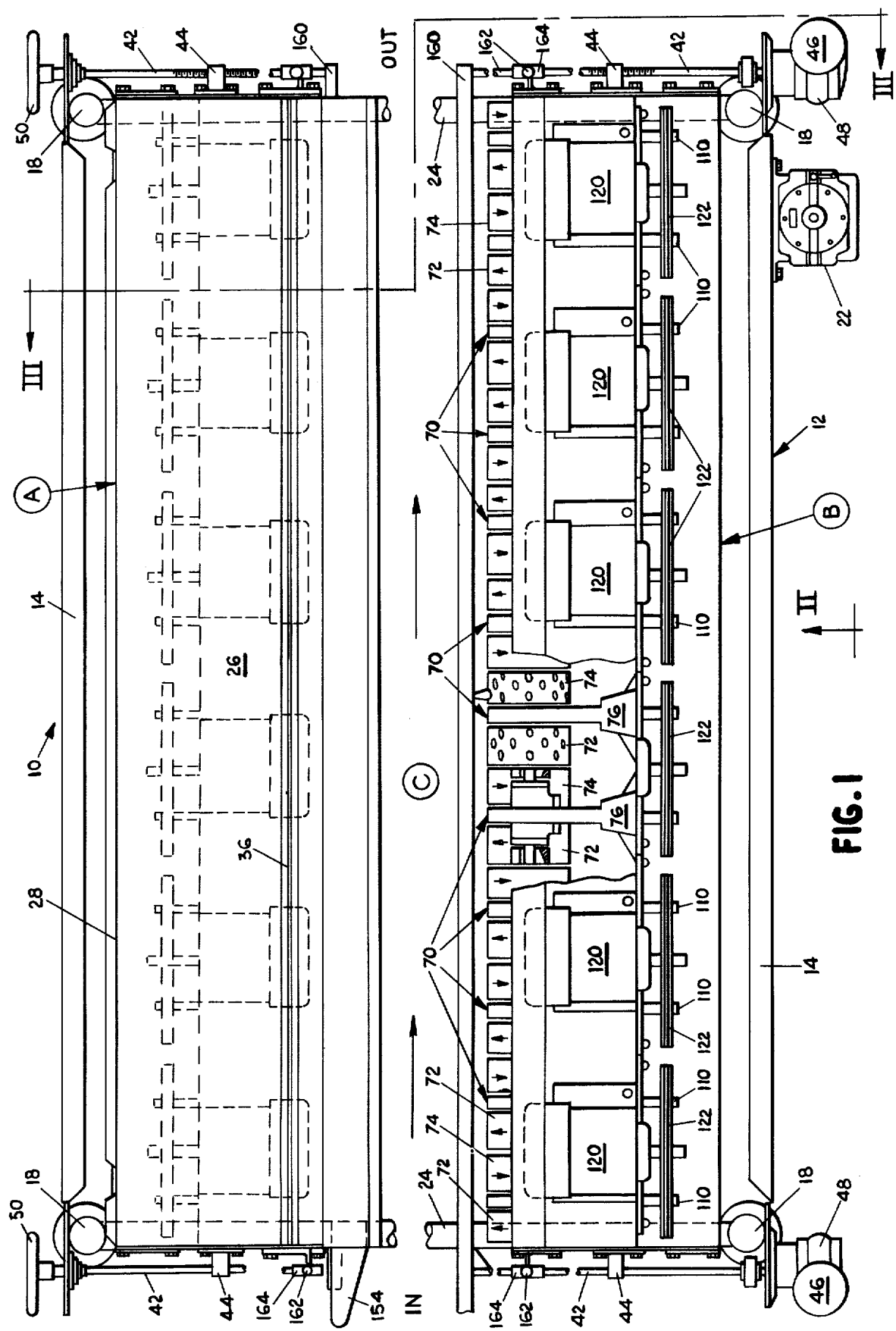
FIG. 1 is a plan view of the fowl picking machine of the present invention, the picking assembly in the upper portion of the figure including its external housing while the picking assembly in the lower portion of the figure has its external housing and a portion of its internal wall removed to reveal the individual drum assemblies.
Figure 2:
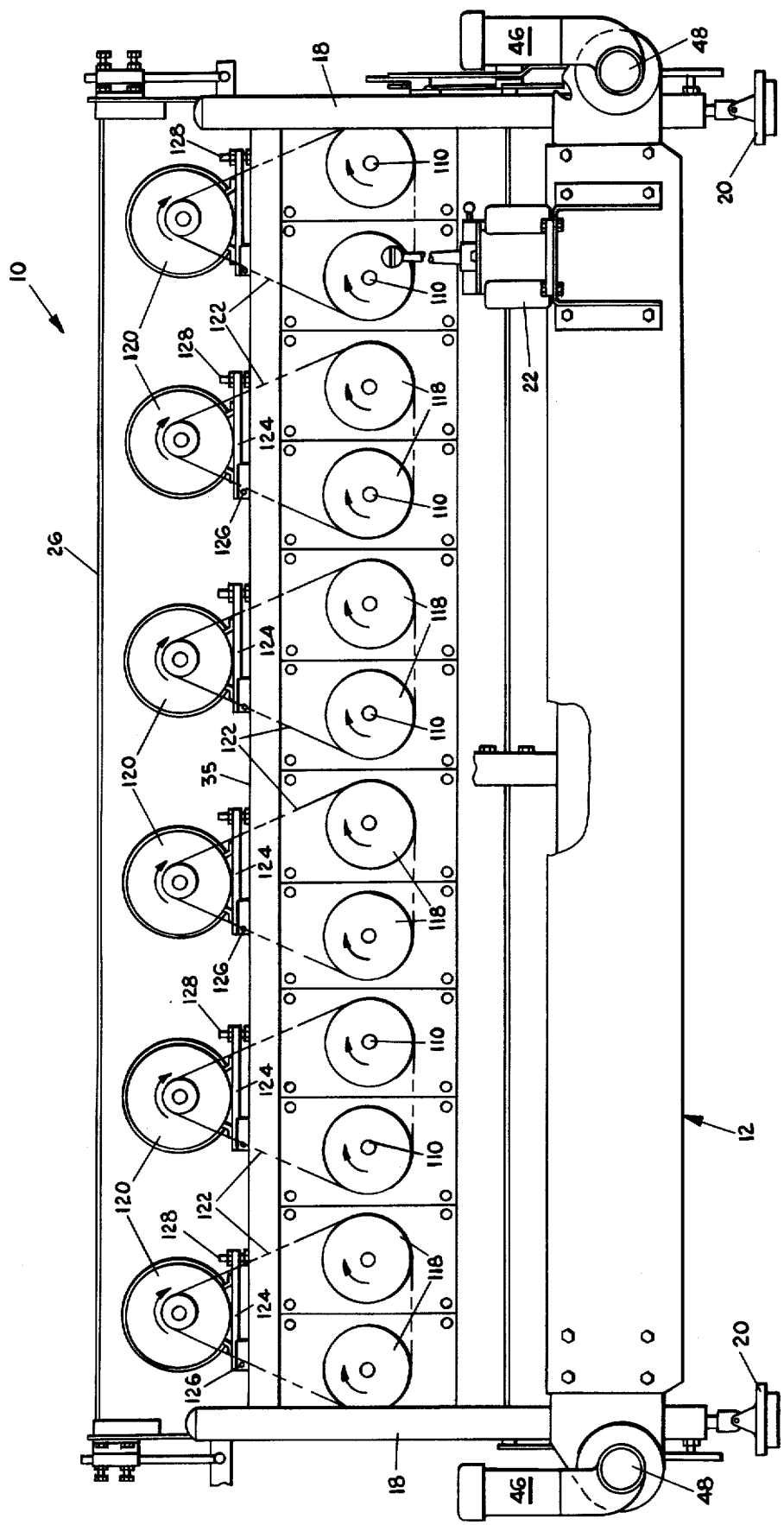
FIG. 2 is a side view of the fowl picking machine taken along plane II of FIG. 1 and illustrating the machine without its external housing.
Figure 3:
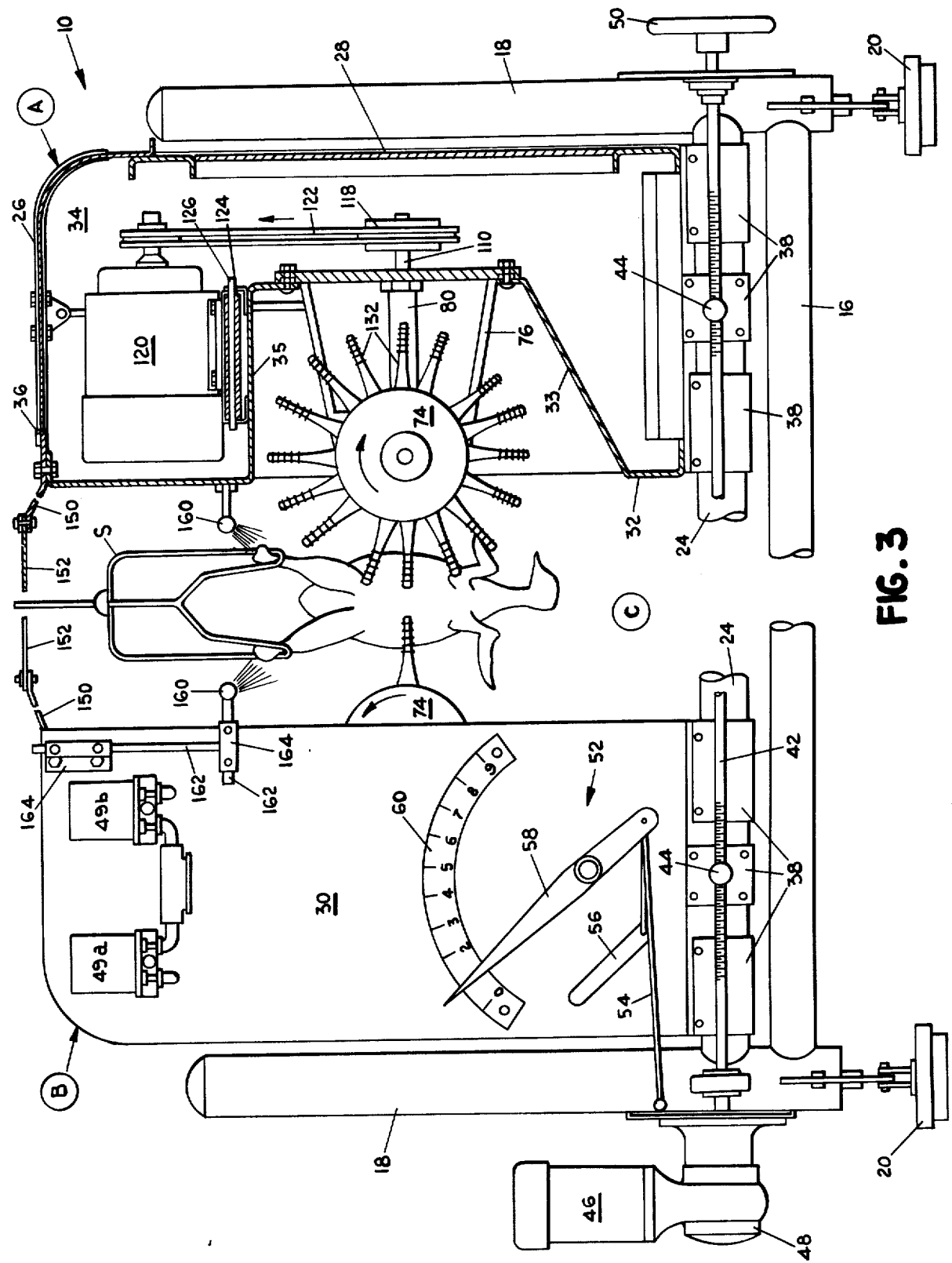
FIG. 3 is a view of the exit end of the fowl picking machine shown partially in cross section and taken generally along line III—III of FIG. 1.

Referring now to the drawings in greater detail, FIGS. 1–3 illustrate the fowl picking machine 10. The machine includes a supporting framework 12 having side frame members 14 and transverse frame members or rods 16 at either end thereof. A vertically upstanding hydraulic cylinder 18 or similar cylinder assembly is located at each corner of the frame for raising and lowering the respective ends of the machine. Each such assembly includes pivoted leveling pads 20 on the lower ends thereof. In the preferred embodiment, the hydraulic cylinders 18 are operated by a hydraulic pump 22 suitably secured to one side of the frame in conventional fashion.

Movably mounted on transverse support rods 24 extending between the cylinders 18 at either end of the machine are the two generally opposing picking assemblies A and B (FIGS. 1 and 3). Each of the picking assemblies A and B is a vertically upstanding, generally horizontally elongated frame or housing including a top cover 26, side cover 28, end covers 30, and inside wall 32. Wall 32 has a recessed portion 33 extending inwardly of the housing toward side wall 28 and forming a closed recess which opens toward the opposite picking assembly. Wall 32 also includes a horizontal step 35 above the recessed portion. Between the wall 32 and recessed portion 33 and the remainder of the picking assembly is an internal chamber 34. Top cover 26 is secured by an elongated hinge 36 to provide access to chamber 34.

Picking assemblies A and B are spaced horizontally apart and define a picking channel C extending therebetween between the two ends of the machine 10. Each of the picking assemblies A and B includes tubular mounting brackets 38 which fit around support rods 24 and slidingly and movably support the assemblies thereon. An adjustment mechanism 40 is provided at either end of the machine for sliding picking assemblies A and B toward and away from each other to change the width of picking channel C to accommodate larger or smaller fowl or poultry. Each of the adjustment mechanisms 40 includes a continuous threaded rod 42 engaging apertured extensions 44 on each of the assemblies. Threaded rods 42 are turned by electric motors 46 through appropriate gearing assemblies 48. A manually operable wheel or handle 50 is provided at the other end of each rod 42 as an alternative means for rotating rod 42. Accordingly, motors 46 are simultaneously operated in one direction to turn threaded rod 42 and move assemblies A and B toward one another, and reversed to turn rods 42 in the opposite direction to move the assemblies apart. Motors 46 are electrically connected to and controlled by barrel switches 49a and 49 b located at the top of one end 30 of one of the assemblies (FIG. 3). Activation of one of the switches causes the motors 46 to rotate rods 42 in one direction while activation of the other switch reverses the said rotation.

An indicator mechanism 52 (FIG. 3) is provided on the end panel 30 of one of the picking assemblies to indicate the width of channel C and includes a connecting arm 54, a pivot arm 56, an indicator pointer 58, and a dial 60. As the assemblies are moved toward one another, arms 54 and 56 are accordingly moved to swing indicator 58 around dial 60 to indicate the specific positions of the assemblies and the corresponding width of channel C.

As shown in FIGS. 1 and 3, each picking assembly A and B includes 12 drum assemblies 70 secured in axial alignment with one another and projecting toward the picking channel C from the rear of the recessed portion 33 of wall 32. The individual drum assemblies are separately bolted to the wall and each supports a pair of counter-rotating picking drums 72 and 74 mounted for counter-rotation on a common axis. Each of the picking drums 72 rotates downwardly through picking channel C while each of the drums 74 rotates upwardly through that channel. Accordingly, the plurality of counter-rotating picking drums alternate with one another beginning with a downwardly rotating drum 72 at the inlet end of the machine as shown in FIG. 1. The downward rotation of the first drum adjacent the inlet forces the suspended fowl downwardly and prevents them from becoming jammed in the drum mechanism as they enter the machine.

Figure 4:
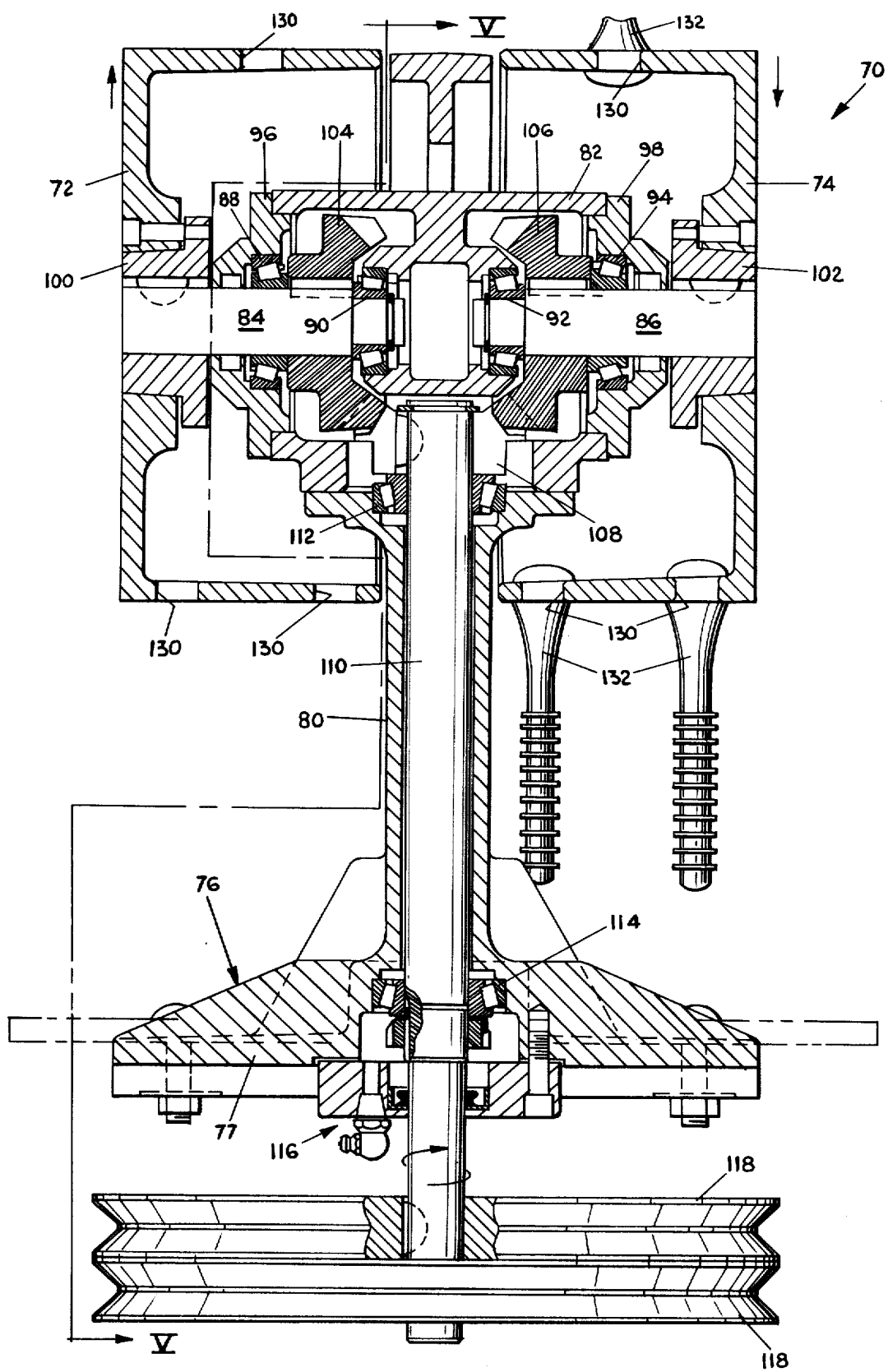
FIG. 4 is a sectional view of one of the drum assemblies illustrating the rotational mounting of the pair of picking drums and the drive means for counter-rotating the same.
Figure 5:
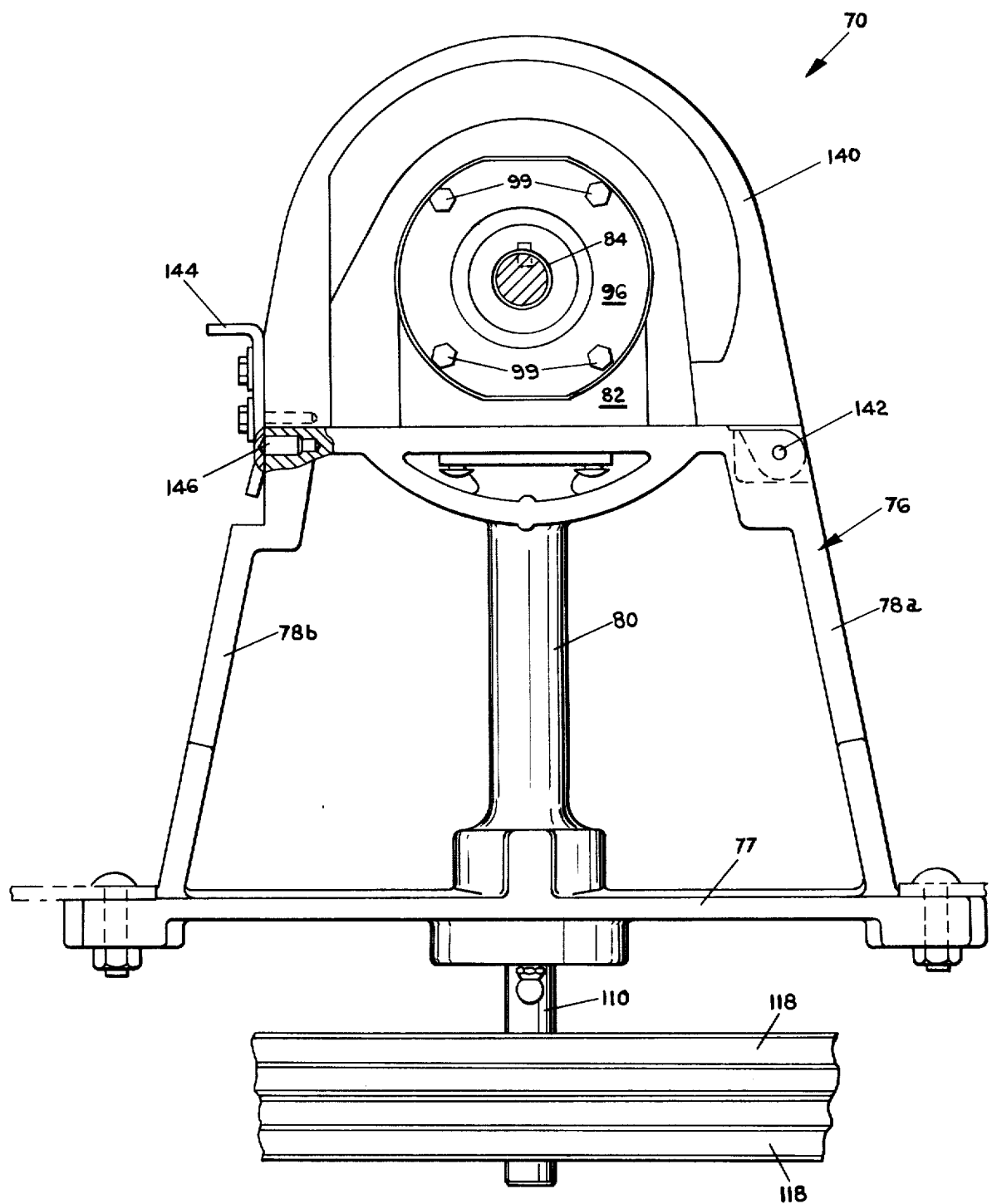
FIG. 5 is a side view of one of the drum assemblies shown partially in cross section and taken generally along line V—V of FIG. 4.

Each of the drum assemblies 70 is similar to all the others. Only one will be described specifically herein and is best seen in FIGS. 4 and 5. As shown therein, each drum assembly 70 includes a support member 76 lying generally in a vertical plane and including upper and lower bracing legs 78a and 78b extending outwardly from a base plate 77 which is bolted to the wall 33 (FIGS. 3–5). Support 76 includes a hollow shaft housing 80 extending between base plate 77 and merging into a gear housing 82 at the support end opposite the base. Extending outwardly from either side of the support member 76 and generally transverse to the vertical plane including that support member are drum shafts 84 and 86. Shafts 84 and 86 are rotatably supported in suitable roller bearings 88 and 90 and 92 and 94, respectively. Bearings 90 and 92 are mounted between the respective shafts and internal flanges in gear housing 82 as shown in FIG. 4, while bearings 88 and 94 are mounted between the respective shafts and end caps 96 and 98, respectively. End caps 96, 98 are secured to gear housing 82 by bolts 99 (FIG. 5). Suitable shaft seals 95 and 97 are provided in end caps 96, 98, respectively, to retain lubricants within housing 82.

Shafts 84 and 86 project outwardly of end caps 96 and 98 and support hubs 100 and 102, respectively, which are fixedly secured thereto via suitable keys. Cylindrical drums 72 and 74 are respectively bolted to hubs 100 and 102. At the inner ends of shafts 84 and 86 are fixedly secured bevel gears 104 and 106, respectively, also by suitable keys. Bevel gears 104 and 106 separately engage a single bevel gear 108 mounted at the gear housing end of a power shaft 110 extending longitudinally through shaft housing 80 and extending outwardly through base plate 77 into the internal chamber 34 of the picking assembly. Shaft 110 is rotatably mounted in roller bearings 112 and 114 at the gear housing and base plate ends of the shaft, respectively. Suitable lubricating means 116 are provided at the base plate end of the power shaft for lubrication of that end of the shaft. Secured on the extending end of shaft 110 are pulleys 118 suitably keyed in place for connection to an electric motor by drive belts as will be explained more fully below. Accordingly, rotation of the power shaft 110 in a clockwise direction as indicated in FIG. 4 will rotate bevel gear 108 in a clockwise direction causing bevel gears 104 and drum 72 to rotate downwardly through picking channel C while bevel gear 106 and drum 74 rotate upwardly through that channel.

As shown in FIGS. 1–3, power is supplied for each power shaft 110 in each of the drum assemblies 70 by an electric motor 120 and a belt-and-pulley arrangement. As shown in FIG. 2, each electric motor 120 rotates a pair of power shafts on drum assemblies which are immediately adjacent one another. Electric motors 120 are connected to a source of electrical power by conventionally known wiring and switch controls (not shown). Power is supplied from the motor via a pair of belts 122 which extend in a triangular path around the motor shafts and pulleys 118 of the adjacent pair of drum assemblies. Each motor 120 is mounted on its own individual pivotal platform 124 atop step 35 within chamber 34. Each platform 124 pivots around a hinge pin 126. Pivotal adjustment of platforms 124 via bolts 128 around pivot pins 126 causes a corresponding tensioning or loosening of belts 122. Accordingly, each motor 120 drives a pair of immediately adjacent power shafts 110 in the same rotational direction.

Referring again to FIGS. 4 and 5, each drum 72 and 74 comprises a cylinder closed on one end and open on the other. Drums 72 and 74 are mounted on shafts 84 and 86 with their closed ends facing outwardly and the open ends facing one another as well as support member 76. Each cylindrical drum 72, 74 includes a plurality of apertures 130 in its cylindrical wall which apertures receive elongated, flexible, resilient rubber picking fingers 132 in conventional fashion. Preferably, drums 72, which rotate downwardly through channel C, include a greater number of picking fingers than do upwardly rotating drums 74. For the embodiment illustrated, cylinders 72 each have 30 fingers radially extending therefrom at circumferentially spaced points while cylinders 74 include 24 spaced fingers. The greater number of downwardly rotating fingers assures a greater picking force exerted downwardly on each fowl than is exerted upwardly even though the counter-rotating drums are rotated at the same speeds. The fowl accordingly remain in a proper suspended picking orientation through the entire machine.

In order to provide easy access to the interiors of the cylindrical drums 72, 74 and to allow maintenance and lubrication of the drum assembly 70 and insertion and removal of the picking fingers 132, a generally U-shaped cover 140 is pivotally secured about hinge pin 142 on the upper side of support member 76 and latched in place by an L-shaped latch member 144 and a spring plunger 146 engaging the same. Cover 140 matches the cylindrical contours of the drums 72, 74 and fills the gap between the two drums to prevent feathers from becoming clogged in the drive mechanisms. However, should maintenance, cleaning, or other service be required, the cover may be unlatched and pivoted away from the drums to allow easy access to the interiors of the drums.

As shown in FIGs. 1–3, guards 150 are provided at the top of the picking assembly housings extending outwardly over the picking channel C to prevent the escape of feathers removed from the fowl during the picking operation. Feather guards 150 include elongated, flexible rubber strips 152. Strips 152 flex to allow passage of the successive shackles S which suspend chickens, turkeys, or other fowl by their hocks between the opposing banks of counter-rotating drums and fingers. Tapered inlet guides 154 are provided at the inlet end of the machine on feather guards 150 to guide the shackles S into the picking channel C.

In order to facilitate the picking operation of the machine, water spray tubes 160 are adjustably supported from either side of the picking channel C above the respective banks of counter-rotating drums as shown in FIGS. 1 and 3. The positions of spray tubes 160 may be adjusted horizontally and vertically in brackets 164 by means of rods 162. The spray tubes 160 spray water downwardly over the fowl as they are picked during passage between the counter-rotating drums and wash the feathers removed in the operation downwardly through the machine to the floor therebeneath.

The operation of the present fowl picking machine will now be apparent. Fowl, poultry, or the like suspended in an inverted manner from shackles S by their hocks are moved by an overhead conveyor (not shown) along a processing path and through the picking machine 10 which is also located along that path. Each suspended fowl is guided into the picking channel C between the picking assemblies A and B by guides 154. The first two cylindrical, opposing picking drums 72 on the opposing picking assemblies A and B rotate their picking fingers downwardly against the fowl. Water sprayers 160 facilitate the feather-removal operation by washing the feathers downwardly through the picking channel C.

Continued movement of the overhead conveyor moves the suspended fowl between the opposing banks of cylindrical, counter-rotating drums 72 and 74. The alternating drums rotate their picking fingers upwardly and downwardly against the fowl along the entire length of the picking channel thereby cleaning all parts of the bird except for the extremities of the hocks thereof. The preferred embodiment illustrates a machine specifically adapted for finishing picking operations in which the drums are generally rotated at speeds less than 500 rpm. It may also be utilized for rough picking by increasing the drive speed.

The machine 10 is adjustable to accommodate generally any size fowl or poultry. The width of picking channel C may be adjusted by operating electric motors 46 via switches 49a and 49b which in turn rotate threaded rods 42 to move picking assemblies A and B toward and away from one another. The vertical height of either end of the entire machine may be adjusted with jacks 18 operated via hydraulic pump 22. Although both ends are preferably aligned at the same vertical level such that the axes of the aligned picking drums are approximately aligned with the mid section of the fowl or poultry as shown in FIG. 3, it is advantageous in certain instances to incline the entire picking machine from one end to the other. In such a case, either the inlet or outlet end will be higher than the opposite end such that the picking fingers for various parts of the picking machine engage vertically higher or lower parts of the fowl to provide a more complete cleaning and picking operation.

As will be appreciated, cleaning, maintenance, and repair of the present machine is greatly facilitated by the individual support of counter-rotating pairs of picking drums 72 and 74. Normal maintenance is possible without removal of the drums merely by pivoting protective cover 140 out of the way and cleaning the interior of the cylindrical drums. Should removal of one of the cylindrical drums be necessary, either the individual drum assembly on which it is located or the individual drum itself may be removed easily without distrubing the drums or drum assemblies immediately adjacent thereto. Further, the electric motors 120 and drive belts 122 are separately located in chambers 34 to isolate the same from the removed feathers thereby preventing undue interference with the operation of the drum assemblies.

While one form of the invention has been shown and described, other forms will now be apparent to those skilled in the art. therefore, it will be understood that the embodiment shown in the drawings and described above is merely for illustrative purposes and is not intended to limit the scope of the invention which is defined by the claims which follow.

The embodiments of the invention in which an exclusive property or privilege is claimed are defined as follows.

1. A fowl picking machine comprising a frame; a pair of horizontally spaced, longitudinally extending picking assemblies supported on said frame and defining a generally horizontally and longitudinally extending picking channel therebetween through which a fowl is moved for picking and cleaning feathers from the same; each picking assembly including a plurality of individual, axially aligned drum assemblies; each of said drum assemblies including a pair of counter-rotating, axially aligned drums which are immediately adjacent and side by side with one another and each rotate in a plane generally transverse to said longitudinally extending picking channel, each of said drum assemblies also including rotation support means for rotatably supporting each pair of drums separately from the next adjacent pair or pairs of drums such that said assemblies provide ease of access, maintenance and repair for each of said pairs of drums; said drums each including a plurality of radially extending, flexible, picking fingers, drive means for individually and separately driving each pair of counter-rotating drums including means for simultaneously rotating said drums in said pair in directions opposite one another; each of said drums in one of said picking assemblies being generally opposite to and rotating through said channel in the same direction as a corresponding drum in the other of said picking assemblies.

2. The fowl picking machine of claim 1 wherein one of said drums in each of said drum assemblies includes a greater number of said flexible, picking fingers than the other of said drums.

3. The fowl picking machine of claim 1 wherein in each of said drum assemblies one of said drums in said pair rotates downwardly in said picking channel while the other of said drums rotates upwardly in said picking channel, said one drum having a greater number of picking fingers secured thereon than said other drum.

4. The fowl picking machine of claim 1 wherein said drive means includes a single power shaft rotatably mounted in each of said drum assemblies, a first gear fixedly secured to said shaft, and two second gears engaging said first gear, one of said second gears fixedly secured in association with one of said two drums while the other of said second gears is fixedly secured in association with the other of said two drums whereby rotation of said shaft and first gear simultaneously rotates said second gears and the drums associated therewith in opposite directions.

5. The fowl picking machine of claim 4 wherein each pair of immediately adjacent drum assemblies in each of said picking assemblies has motive power means for rotating said single power shafts included in said two drum assemblies.

6. The fowl picking machine of claim 5 wherein said motive power means includes an electric motor and belt and pulley means for connecting said electric motor to said power shafts.

7. The fowl picking machine of claim 4 wherein each of said drum assemblies includes two axially aligned drum shafts rotatably mounted therein; each of said second gears and the drum associated therewith being fixedly secured to one of said drum shafts.

8. The fowl picking machine of claim 7 wherein said power shaft is rotatably mounted with its axis perpendicular to the axes of said drum shafts; said first and second gears comprising bevel gears.

9. The fowl picking machine of claim 1 wherein said picking channel has inlet and outlet ends; drive means on the first drum assembly on each of said picking assemblies on either side of said picking channel including means for driving the first drum adjacent said inlet end such that said first drum rotates downwardly through said picking channel.

10. The fowl picking machine of claim 1 wherein each of said picking assemblies is mounted for movement on said frame in a direction generally transverse to said picking channel; power means for simultaneously moving said picking assemblies toward and away from one another to change the width of said picking channel and the distance between said opposing drum assemblies.

11. The fowl picking machine of claim 10 wherein said frame includes means for raising and lowering each end of said machine whereby the vertical positions of the ends of said picking channel are adjustable.

12. The fowl picking machine of claim 1 including water spraying means mounted adjacent each of said picking assemblies on either side of said picking channel for spraying water downwardly through the picking fingers on said drums and against said fowl to wash the picked feathers out of said machine.

13. In a fowl picking machine of the type including a frame, a pair of horizontally spaced and longitudinally extending picking assemblies defining a generally horizontally and longitudinally extending picking channel therebetween through which a fowl is moved for picking and cleaning feathers from the same, and a plurality of drums mounted in each of said picking assemblies, each drum being rotatable in a plane generally transverse to said picking channel and having a plurality of flexible, resilient picking fingers extending therefrom for engaging and picking a fowl, the improvement comprising: support means separately mounting a plurality of pairs of said drums in each of said picking assemblies; said support means including a plurality of drum assemblies for individually rotationally mounting a pair of said drums immediately adjacent and axially aligned with one another, each of said drum assemblies including rotation support means for rotatably supporting each pair of drums separately from the next adjacent pair or pairs or drums such that said assemblies provide ease of access, maintenance, and repair for each of said pairs of drums; and separate drive means for each drum assembly for simultaneously driving said two drums in each of said drum assemblies in counter-rotational, opposite directions whereby one drum and the picking fingers thereon rotate downwardly through said picking channel while the other drum and the picking fingers thereon rotate upwardly through said picking channel.

14. The improvement of claim 13 wherein one drum in said pair of drums on each drum assembly includes a greater number of picking fingers than the other drum in said pair.

15. The improvement of claim 14 wherein said one drum which rotates downwardly through said channel includes a greater number of picking fingers.

16. The improvement of claim 13 wherein said drive means for one drum assembly includes a single power shaft rotatably mounted in each of said drum assemblies, a first gear fixedly secured to said shaft, and two second gears engaging said first gear, one of said second gears fixedly secured in association with one of said two drums, the other of said second gears fixedly secured in association with the other of said two drums, and motive power means for rotating said power shaft whereby said motive power means rotates said power shaft and first gear which in turn simultaneously rotates said second gears and the drums associated therewith in opposite directions.

17. The improvement of claim 16 wherein said motive power means includes an electric motor and belt and pulley means for connecting said motor to said power shaft as well as the power shaft of a drum assembly immediately adjacent to said one drum assembly.

18. The improvement of claim 16 wherein each of said picking assemblies includes an external housing and an internal wall defining an elongated recess opening into said picking channel and a chamber between said wall and housing; each of said drum assemblies including a support member extending generally in a vertical plane toward said picking channel from said wall in said recess in one of said picking assemblies, a pair of axially aligned drum shafts rotatably secured adjacent the channel end of said support member and generally transverse to said vertical plane, said rotation support means including one drum shaft extending to either side of said support member, one of said second gears and its associated drum mounted on each of said drum shafts, said power shaft extending through said support member and said wall, said motive power means mounted in said chamber and engaging the end of said power shaft on the chamber side of said wall.

19. The improvement of claim 18 wherein each of said drums is cylindrical and closed on one end, said drums being mounted with their open ends facing one another; said drum assembly further including a pivotable cover mounted on said support means between said drums for providing maintenance access to the interiors of said drums.

20. The improvement of claim 16 wherein said drums are cylindrical and closed on one end, said drums being mounted with their open ends facing one another; said drum assembly further including a pivotable cover thereon between said drums for providing maintenance access to the interiors of said drums.

21. A picking apparatus for a fowl picking machine comprising a housing; means for supporting said housing in a location for picking fowl; a pair of axially aligned, cylindrical drums for receiving a plurality of flexible picking fingers; drum shaft means extending in one direction from said housing for rotatably supporting said drums adjacent one another; power shaft means extending in said housing in a second direction perpendicular to said first direction for rotating said drums; and gear means on said power shaft means for rotating both of said drums; said housing including cover means intermediate said drums for protecting said drum shaft means, power shaft means, and gear means from feathers, dirt, and other contaminants and for providing maintenance access to said drums, shaft, and gear structure.

22. The picking apparatus of claim 21 wherein said gear means includes a first gear mounted on power shaft means and a pair of second gears, each second gear being mounted on said drum shaft means in operable association with one of said drums, said second gears engaging said first gear and being counter-rotated thereby for counter-rotating said drums.

23. The picking apparatus of claim 21 wherein said drums each have a closed end and an open end, said drums being mounted on said drum shaft means with their open ends facing one another; said cover means including a cover pivotally mounted on said support means between said drums providing maintenance access to the interior of said drums.

24. The picking apparatus of claim 21 including an electric motor and belt and pulley means for connecting said motor and said power shaft means to rotate the same.

25. In a fowl picking machine of the type including a frame, a pair of horizontally spaced and longitudinally extending picking assemblies defining a generally horizontally and longitudinally extending picking channel therebetween through which a fowl is moved for picking and cleaning feathers from the same, a plurality of counter-rotating drums mounted in each of said assemblies, each drum being rotatable in a plane generally transverse to said picking channel and having a plurality of flexible, resilient picking fingers extending therefrom for engaging and picking a fowl, and drive means for rotating every other one or said drums in each of said assemblies in opposite directions, the improvement comprising: the drums rotated downwardly through said picking channel including a greater number of picking fingers than the drums rotated upwardly through said channel whereby fowl to be picked are maintained in proper picking orientation during passage through the machine.

26. The improvement of claim 25 including a plurality of support means for rotatably supporting individual pairs of drums, said drive means including means in each of said support means for counter-rotating said pair of drums in said support means at the same rotational speed.

27. A picking apparatus for a fowl picking machine comprising a pair of axially aligned, cylindrical drums for receiving a plurality of flexible picking fingers; drum shaft means extending along the aligned axes of said drums for rotational support of said drums; said cylindrical drums each being closed at one end and open at the other and positioned on said drum shaft means with said open ends extending toward one another; housing means for protecting said apparatus from feathers, dirt, and other contaminants including an arcuate cover extending intermediate said drums, said open drum ends being immediately adjacent said cover to prevent entry of contaminants between said cover and drum ends to the interior of said drums; means on said housing for movably mounting said cover such that said cover may be moved away from the drums for maintenance access to said drum interiors; power shaft means in said housing means extending perpendicularly to said drum shaft means for rotating said drums; cooperating gear means on said power and drum shaft means for transferring rotational movement from said power shaft means to said drum shaft means for simultaneous rotation of said drums; means on said power shaft means for transmitting rotational movement from a rotational power source to said power shaft means; and means for suppoting said apparatus in position to allow picking fingers on said drums to contact fowl to be picked.

28. The picking apparatus of claim 27 wherein said gear means include a first bevel gear on said power shaft means; said drum shaft means including a separate drum shaft for mounting each of said drums; and mating bevel gears, one on each of said drum shafts on either side of said first bevel gear and engaging said first bevel gear, the rotation of said power shaft means and thus said first bevel gear causing simultaneous counter rotation in opposite rotational directions of said drums mounted on said drum shafts.

29. Apparatus for a fowl picking machine comprising a drive shaft housing; a drive shaft rotatably mounted in said housing; a gear housing communicating with said drive shaft housing and having said drive shaft protruding thereinto; a pair of aligned drum shafts rotatably mounted within said gear housing and protruding from opposite sides thereof; gear means within said gear housing for drivingly interconnecting said drive shaft and said drum shafts; a pair of cylindrical finger supporting drums each having a generally open end and a generally closed end, the closed end of each of said drums being mounted on the protruding sections of said drum shafts for rotation therewith, the open ends extending toward one another in generally surrounding relationship with respect to said gear housing; said open ends being spaced sufficiently from one another for passage of said drive shaft housing therebetween; and an arcuate cover positioned intermediate the open ends of said drums along at least that portion of the periphery thereof generally opposite from said drive shaft housing, said cover substantially sealing the peripheral space between said drums along said portion to discourage entry of contaminants thereinto, said cover being removeable to permit access to the interior of said drums for servicing purposes.

30. The apparatus as set forth in clam 29 which further comprises a support member affixed to said drive shaft housing.

31. The apparatus as set foth in claim 30 wherein said gear means includes means for rotating said drums in opposite directions.

* * * * *